United States Patent

[11] 3,603,231

| [72] | Inventor | Jess Oppenheimer<br>549 Mareno, Los Angeles, Calif. 90000 |
|---|---|---|
| [21] | Appl. No. | 613,674 |
| [22] | Filed | Feb. 2, 1967 |
| [45] | Patented | Sept. 7, 1971 |

[54] OPTICAL EXPOSURE SYSTEM
10 Claims, 6 Drawing Figs.

[52] U.S. Cl............................................. 95/15,
355/47
[51] Int. Cl............................................. G03b 37/00
[50] Field of Search............................................. 95/15;
88/24; 352/86; 355/47

[56] References Cited
UNITED STATES PATENTS
1,616,636  2/1927  Prosser...................... 352/86 (X)
2,299,682  10/1942  Conant...................... 95/15 (UX)
2,361,390  10/1944  Ferrill...................... 352/86 (UX)

*Primary Examiner*—Samuel S. Matthews
*Assistant Examiner*—Robert P. Greiner
*Attorney*—Nilsson, Robbins, Wills and Berliner ABSTRACT: The illustrative embodiments disclose a system for exposing a surface to an optical image, which surface extends in part axially to the optical image. As illustrative of a variety of surfaces, spherical surfaces are disclosed to be exposed by both mechanical apparatus and electrooptical apparatus by synchronously displacing the surface relatively along the optical axis as the image is scanned onto the surface. In one embodiment progressive masks are employed as the focal plane is altered. Another embodiment discloses a flying spot scanner synchronously operated with displacement of the target image along the optical axis.

PATENTED SEP 7 1971
3,603,231
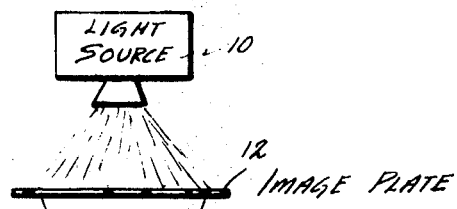
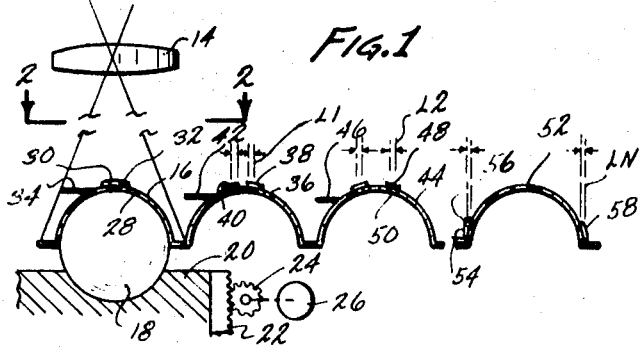
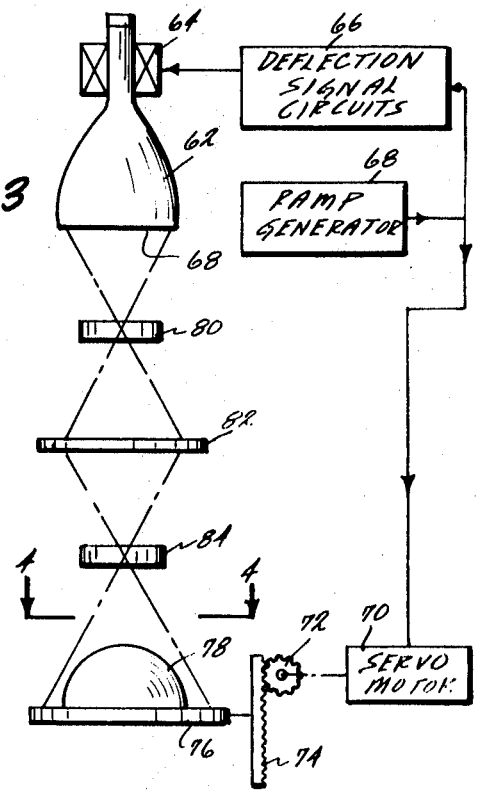
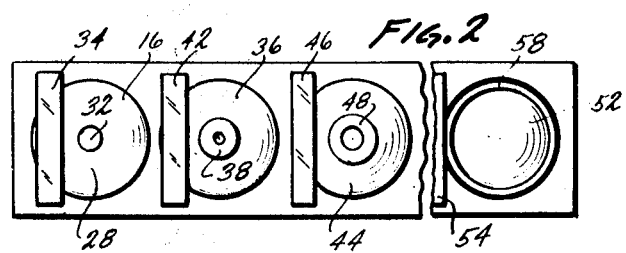
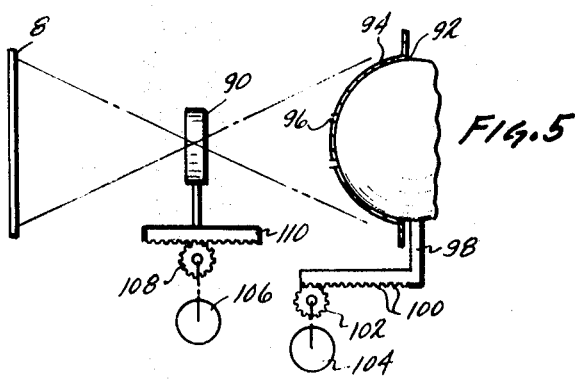
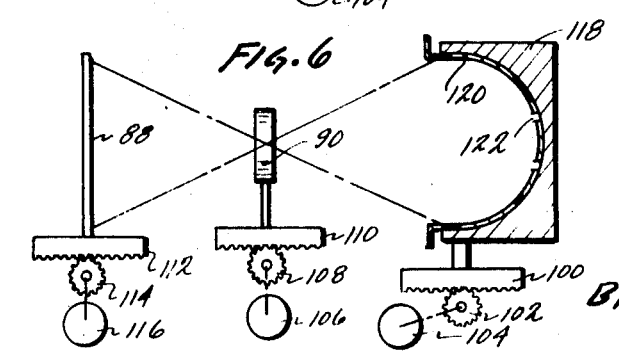
INVENTOR
JESS OPPENHEIMER
BY Wilson, Watkins & Anderson
ATTORNEYS

OPTICAL EXPOSURE SYSTEM

BACKGROUND OF THE INVENTION

In the production of a wide variety of objects from toys to artifacts it is desirable to produce an image or pattern of a dimensional surface. In general, a wide variety of techniques have been employed to accomplish representations on the spherical surface of globe and other bodies; however, usually the basic techniques have either required considerable manual labor, or have printed the images on a flat sheet which is then stretched and distorted onto a dimensional surface. Therefore, these operations have either been traditionally performed by very expensive machines, or by similarly expensive skilled technicians working by hand. Therefore, a need exists for an improved system of accomplishing an image on a dimensional surface, as by photographic or other processes which can be economically and rapidly performed.

A visual image can, of course, be accomplished on virtually any surface by applying a photosensitive coating, exposing the coating to an optical image, then developing the exposed image. However, normally, the light or optical image has a single focal plane in which only a portion of a dimensional surface can lie. Therefore, the image accomplished on a dimensional surface is in sharp focus only at one incremental surface. Therefore, prior photographic systems have not been suitable to accomplish a visual image or pattern on a dimensional surface.

SUMMARY OF THE INVENTION

In general a representative structure for practicing the system hereof might include means for developing a light image or pattern to which the dimensional or geometric surface is to be exposed. The image is then fragmentarily projected onto the geometric surface while the focal plane is altered in synchronized relationship to the areas of the surface undergoing exposure.

By various structures for practicing the invention, hereof, certain objects are accomplished, as providing an improved system for reproducing an image on a geometric or three-dimensional surface which system may also incorporate desired distortion and means for special optical effects.

BRIEF DESCRIPTION OF THE DRAWINGS

The present invention will be apparent from a consideration of the following description taken in conjunction with the accompanying drawings, which are all presented by way of illustrative example only; and in which:

FIG. 1 is a diagrammatic representation illustrating the system of the present invention;

FIG. 2 is a sectional view along line 2—2 of FIG. 1;

FIG. 3 is a diagrammatic representation of another system incorporating the principles of the present invention;

FIG. 4 is a sectional view taken along line 4—4 of FIG. 3;

FIG. 5 is a diagrammatic representation illustrating still another system constructed in accordance with the present invention; and FIG. 6 is a diagrammatic representation of still a further system constructed in accordance with the present invention.

It is stressed that the particulars shown in the various figures herein are by way of example only and for purposes of illustrative discussion. In particular, no attempt has been made to show structural features of the apparatus in greater detail than is necessary for a fundamental understanding of the invention, the description taken with the drawings making apparent to those skilled in the art of image reproduction, the means and method by which several forms of the invention may be practiced. In addition, the illustrative structure disclosed herein is not to be taken as limiting the invention which is to be defined by the appended claims, forming along with the drawings a part of this specification.

DETAILED DESCRIPTION OF ILLUSTRATIVE EMBODIMENTS

Considering the system thereof in detail, reference will initially be made to the structure of FIG. 1. A light source 10 is shown to illuminate an image plate 12 which may take the form of a photonegative representation of the image to be printed. Light passing through the plate 12 (representative of image) is focused by a lens 14 onto an apertured mask 16 covering a spherical body 18. The function of the system illustrated in FIG. 1 is to print the image carried on the plate 12 on the spherical surface of the body 18. The surface of the body 18 may carry a photosensitive emulsion to record the image. The body 18 is held on a movable support 20 which may be variously positioned relative the lens 14 (along the image axis) by a rack 22 engaged with a gearwheel 24 carrying a handle 26. The operation of the system of FIG. 1 in accordance with the principles of the present invention may now best be considered by describing the process of exposing the surface of the body 18 to the image carried on the plate 12, during which description, additional structural details of the system will be identified.

Initially, the segmented mask 16 is positioned as shown, with the first hemispherical section 28 covering the spherical body 18. It is to be noted, that a central aperture 30 in the section 28 exposes a polar spot on the body 18; however, the aperture 30 is closed by an opaque cap 32. With the image plate 12 in position, to receive light from the source 10 and provide a light image through the lens 14, the gearwheel 24 is revolved by the knob 26 to focus the light image upon a focus plate 34 extending from the hemispherical section 28. The focal plane of the plate 34 substantially coincides with the focal plane of the spot on the spherical body 18 that will be exposed upon removal of the cap 32.

After the focusing is accomplished, the light source 10 is deenergized, the cap 32 is removed from the aperture 30 and the light source 10 is energized for a desired exposure interval. As a result, the central portion of the image carried on the plate 12 is provided as a light image to the polar spot being exposed on the body 18. At the completion of the exposure, the mask 16 is shifted so that the second hemispherical section 36 covers the spherical body 18. It is to be noted that the section 36 defines an annular aperture 38 closed by a removable opaque ring 40. The annular aperture 38 is concentric to the aperture 30 in relation to the spherical body 18; therefore, the superimposition of the apertures 30 and 38 produces a fully exposed section at the top of the sphere 18.

With the section 36 over the spherical body 18, the image from the plate 12 is now focused upon a focus plate 42 which indicates the exposure plane on the body 18 through the annular aperture 38. As previously, focusing is accomplished by moving the support 20 along with the spherical body 18 and the mask 16 through the rack 22 and the gearwheel 24. When the image is properly focused on the plate 42, the light source is turned off, the cover ring 40 is removed and the light source is energized to expose an annular portion of the body 18 to the image that is focused by the lens 14.

Next, in darkness, the hemispherical section 44 of the mask 16 is placed over the spherical body 18 and the operation is repeated; i.e., focusing onto a plate 46, then removing the closure ring 48 from the annular aperture 50 through which an annular surface on the sphere is exposed. In this manner, the operation is repeated in steps, each of which expose another annular surface on the sphere 18 to the light image. As a result, the composite exposure of the spherical body 18 is to a full section of the image carried on the plate 12. The final step in the exposure is accomplished using the mask section 52 as shown, which includes a focusing plate 54 for use in relation to an annular aperture 56 normally closed by a cover ring 58. Summarizing the incremental exposure operation, each section of the mask 16 defines a circular area of exposure which when mated with other areas completely covers the spherical body 18. The relationship of the progressively expanding annular apertures is indicated by dashed lines L1, L2, and Ln.

Upon the completion of the exposure of the surfaces of the sphere 18, the coating thereon may be processed to print or set the image. That is, for example, if a photosensitive emulsion is carried upon the surface 18, it may be developed and set in accordance with well-known photographic techniques providing the desired visual image.

As somewhat apparent, in view of the above description, the exposure pattern or sequence may be varied as may the portion of the spherical body 18 which is exposed to the image. For example, a spherical or other dimensional form as the body 18 may be taken a section at a time with the result that the entire sphere can be covered by an image or alternatively, a relatively small section only may be used to display the image. In this regard, rather special effects can be obtained by selecting the manner of exposing the sphere. For example, in exposing a polar spot on the sphere, the exposure plane is not significantly altered; however, in exposing a somewhat equatorial annular section of the sphere 18, as through the mask section 52, exposure surface is of significant depth. Therefore, in viewing the image along the optical axis of the lens 14, it appears true; however, in viewing the image from a point perpendicular to the optical axis, distortive effects are displayed. Of course, these effects may be employed to accomplish desired objectives, or they can be compensated somewhat by confining a sequence of exposures of the spherical body to a limited surface. Furthermore, in some situations, it may be desirable to provide mating apertures for exposures of different planes on the spherical or other irregular body which are polygonal in form so as to accomplish mating relationship between several composite exposed areas.

As readily apparent from the above description, the system of the present invention may be practiced under manual control; however, in some instances, machine operation is desired. A fast-operating automatic embodiment of the system will now be considered with reference to FIG. 3.

Light for the image in the system of FIG. 3 is provided by a cathode-ray tube 62 which is somewhat similar to cathode-ray tubes of the prior art employed in flying-spot scanners to accomplish light of a relatively high intensity. The tube 62 includes deflection coils 64 which receive control signals from deflection signal circuits 66. The deflection signal circuit 66 in cooperation with the deflection coils 64 impart a circular deflection pattern to the beam formed within the tube 62. That is, for example, sine waves (sources not shown) are applied to both the horizontal and vertical deflection coils in such a phase relationship to cause the electron beam to impinge on the face 68 of the tube 62 in a circular pattern. Circuits and deflection coils for developing circular scanning patterns are very well known in the prior art, both as related to radar and television systems.

The deflection signal circuits 66 are controlled by a ramp generator 68 which provides a generally linearly increasing voltage to control the amplitude of the output from the circuits 66 resulting in a spiral path for the beam over the face 68 of the tube. The ramp voltage provided from the generator 68 is also applied to a servomotor 70 which displaces a gearwheel 72 by a total angle proportionate to the amplitude of the received voltage. The gearwheel 72 engages a rack 74 which carries a platform 76 supporting a hemispherical body 78 upon which an image is to be printed. The body 78 may be covered with photographic emulsion or other light-sensitive or radiation reacting material for exposure to the desired image.

The light image is developed by the circular scanning spot of illumination on the face 68 of the tube 62. The spot of light is passed through a lens 80 to a photonegative slide or plate 82 bearing the image to be formed. Of course, the slide may take various forms to provide a light image which is focused by a lens 84 into a plane through which the hemispherical body 78 extends.

Considering the operation of the system in detail, prior to an exposure period the output of the ramp generator 68 is a null signal with the result that the output of the servomotor 70 is null and the gearwheel 72 leaves the rack 74 in a reset position, fully remote from the lens 84. The null signal from the ramp generator 68 applied to the deflection signal circuits 66 results in a null output to the coils 64 imparting no deflection so that upon the formation of an electron beam in the tube 62, the beam will dwell substantially at the center of the face 68. Now, upon energization of the tube 62 to develop a beam to dwell upon the face 68, the ramp generator 68 is also energized to initiate the generation of a ramp voltage. As a result, the electron beam in the tube 62 impinges upon a small spot at the center of the face 68 then begins a spiral or ever increasing circular motion under control of the ramp generator. As the spiral gradually increases in diameter, the servomotor 70 also receives the increasing ramp voltage driving the gearwheel 72 to in turn drive the rack 74 so as to move the platform 76 and the body 78 continually closer to the lens 84. As the spiral light spot passes through the image plate 82 and its intensity modulated to carry the desired image, it impinges upon the hemispherical body 78 which is moved through the focal plane of the spot so that the fractional image impinging upon the body 78 remains substantially in focus. Referring to FIG. 4, the scanning pattern over the body 78 is indicated by a line 86. As the line moves outwardly during the spiral scanning operation, the distance between the lens 84 and the body 78 (FIG. 3) would normally increase. However, to preserve focus, the rack 74 is driven to maintain the exposed surface of the body 78 in the focal plane of the lens 84. When the circular scanning pattern reaches the exterior of the body 78, the cathode-ray beam from the tube 62 is cut off, the exposure cycle being complete.

By employing the system as described above, exposure of an irregular or dimensional surface to a light image may be accomplished very rapidly. Of course, the scanning rate pattern and so on are dependent upon the desired exposure of the body. Upon completion of the exposure, the body may be subjected to further chemical treatment to develop and set a photographic image. Of course, other treating techniques may also be employed in accordance with particular objectives.

In addition to the specific structures described above, the system of the present invention may also be employed, as suggested above, to accomplish various special effects. To accommodate such special-effect operations, it may be desirable to utilize an optical bench somewhat as represented in FIGS. 5 and 6. Referring initially to FIG. 5, an image plate 88 is illuminated from a source of light (not shown) so that a light image is received by a lens 90 to be focused somewhat at the location of a body 92. The body 92 is partly covered by an opaque mask 94 having an aperture ring 96. The body 92 is carried upon a support 98 that is integral with a rack 100 which engages a gearwheel 102 and may be variously positioned by a control knob 104. The position of the lens 90 is also easily controlled by a knob 106 mechanically coupled to a gearwheel 108 which engages a rack 110 upon which the lens 90 is supported. The arrangement as shown in FIG. 5 may be employed to expose the surface of the body 92 essentially as described with references to FIGS. 1 and 2; however, by providing a movable mount for the lens 90, certain distortive effects can be accomplished. For example, by varying the focal plane of the image, the actual size of the image components can be varied as desired.

As shown in FIG. 6, components similar to those described with reference to FIG. 5 carry similar identification numbers. In the system of FIG. 6, an image-bearing plate 88 is carried on a rack 112 that is engaged by a gearwheel 114 which may be variously driven by a knob 116. Also, in the structure of FIG. 6, the body 118 is concave and receives a concave-convex mask 120 containing an aperture 122. In this regard, the concave body 118 is provided merely to illustrate the fact that various dimensioned surfaces may be exposed to an image in accordance with the present invention, which surfaces are formed to define deviations from an optical plane.

In using the structural setup of FIG. 6, special effects as previously indicated may be accomplished and the ability to vary the position of the image plate 88 independent of the positions of the lens 90 and the body 118 is sometimes desirable. As shown, each of the elements in the system, i.e., the plate 88, the lens 90, and the body 118 may be varied independently of the position of the other two elements. Thus, considerable flexibility is possible.

In general, the important feature of the present invention resides in the consideration of varying the focal plane relationship to a body upon which an image is to be produced, so as to preserve the section of the body being exposed in focus. As indicated above, this system may be employed either in high production techniques to accomplish a predetermined pattern upon a spherical or other nonplanar surface, or alternatively, the system may be employed in various custom arrangements to produce a single exposed object. Thus, there has been exposed examples of several forms of the system which achieve the object and exhibits the advantages as set forth above.

What is claimed is:

1. A method of optically exposing a dimensional body bearing a dimensional photosensitive surface, to a plane light image, as for use in photography, comprising the steps of:
providing light image for projection along an optical axis;
selectively projecting different fragmentary areas of said image along said optical axis to impinge upon different areas of said body; selectively altering the focal plane of various of said fragmentary areas projected along said optical axis in relation to said body in synchronism with the projection of said different areas whereby said fragmentary areas of said image are focused at said dimensional photosensitive surface; and processing said photosensitive surface to develop said image thereon.

2. A method according to claim 1 wherein said body is positioned in alignment in said optical axis whereby to provide at least one surface not perpendicular to said optical axis.

3. A method according to claim 2 wherein selective projecting is accomplished by scanning said image with radiant energy whereby to selectively project different areas thereof along said optical axis onto said body.

4. A method according to claim 1 further including the preliminary step of coating said body with a light-sensitive medium.

5. A method according to claim 4 further including the steps of developing said light sensitive medium subsequent to exposure.

6. A method according to claim 1 wherein said body is moved during exposure thereof.

7. A method according to claim 1 wherein said image is moved during exposure of said body.

8. A system for exposing a body to an image as for photographic development, comprising:
means for projecting selected fragmentary areas of said image on to said body in sequence; and
means for varying the relationship between the focal plane of said projected areas and said body in accordance with said sequence.

9. A system according to claim 8 wherein said means for projecting comprises means for dissecting an image whereby to modulate a radiation beam indicative of said image and means for scanning said radiation beam over said body.

10. A system according to claim 9 further comprising means for displacing said body axially to said beam in accordance with the dimension of said body as the scanning thereof proceeds.